(12) United States Patent
Shiffman et al.

(10) Patent No.: US 6,424,634 B1
(45) Date of Patent: Jul. 23, 2002

(54) WIRELESS DUPLEX COMMUNICATION SYSTEM AND METHOD OF OPERATING SAME

(75) Inventors: Arie Shiffman, Ra'anana; Dany Marcus, Rishon Lezion; Yechiel Blum, Maccabim; Haim Itah, Yavne, all of (IL)

(73) Assignee: Innowave ECI Wireless Systems Ltd., Petach Tikva (IL)

( * ) Notice: Subject to any disclaimer, the term of this patent is extended or adjusted under 35 U.S.C. 154(b) by 0 days.

(21) Appl. No.: 09/156,978

(22) Filed: Sep. 18, 1998

(51) Int. Cl.[7] .................................................. H04J 3/00
(52) U.S. Cl. ..................... 370/280; 455/101; 455/277.1
(58) Field of Search ................................ 370/296, 277, 370/278, 280, 282, 294, 328, 329, 334, 339, 345; 455/101, 277.1, 277.2, 135; 375/347

(56) References Cited

U.S. PATENT DOCUMENTS 4,710,944 A * 12/1987 Nossen ........................ 375/267
5,315,185 A * 5/1994 Usimaru ........................ 327/63
6,243,565 B1 * 6/2001 Smith et al. ................. 455/101

OTHER PUBLICATIONS

Surfing on Waves of Innovation, Innowave Tadiran Telecommunications, Wireless Systems Ltd., (date unknown).
MultiGain Wireless System Description, Innowave Tadiran Telecommunications, Wireless Systems Ltd., Oct. 1996.

* cited by examiner

Primary Examiner—Kwang Bin Yao
(74) Attorney, Agent, or Firm—Needle & Rosenberg, P.C.

(57) ABSTRACT

A wireless duplex communication system, particularly for high density service areas serviced by a plurality of radio port units each including receiver-transmitter circuitry and an antenna; characterized in that each radio port unit further includes a first port for connecting the receiver-transmitter circuitry of one radion port unit to the antenna of another radio port unit in the same service area and a second port for connecting the antenna of said one radio port unit to the receiver-transmitter circuitry of said another radio port unit, whereby each of the two radio port units shares the antenna of the other radio port unit to provide space diversity.

20 Claims, 5 Drawing Sheets

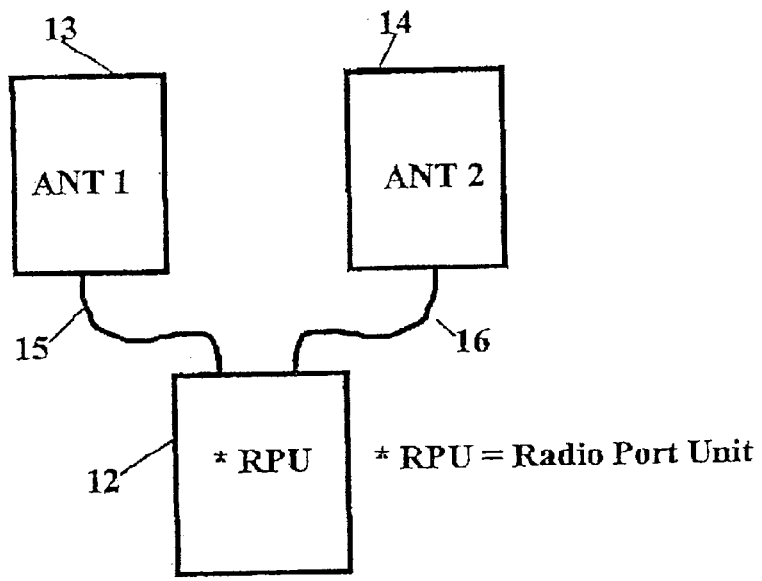
FIG. 1 - Prior Art
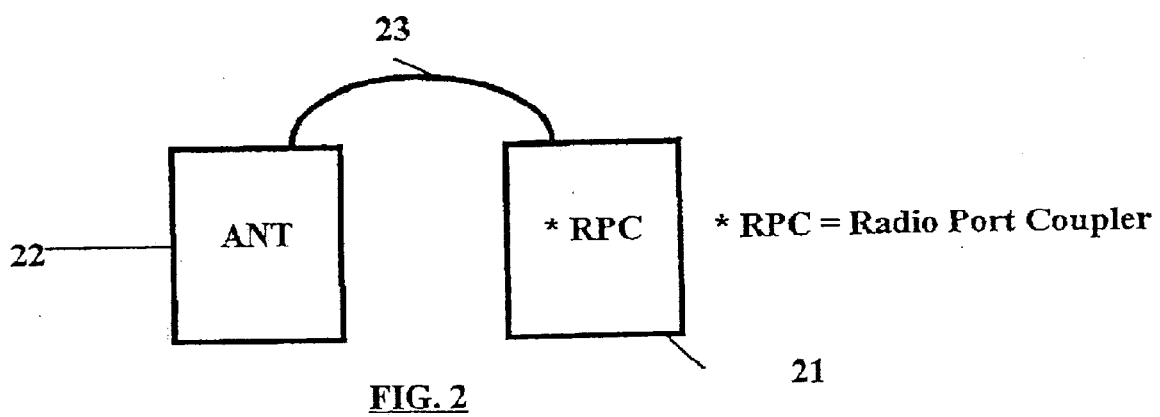
FIG. 2

WIRELESS DUPLEX COMMUNICATION SYSTEM AND METHOD OF OPERATING SAME

FIELD AND BACKGROUND OF THE INVENTION

The present invention relates to a wireless duplex communication system, and also to a method of operating such a system. The invention is particularly applicable to Wireless Local Loop (WLL) Time Division Duplex (TDD) digital systems, and is therefore described below with respect to such systems.

Wireless radio communication is subject to the adverse effects of signal fading and multi-path reflections in which the received signal exhibits distortion and fluctuations in strength. This in turn detrimentally affects the reliability of the communication link. Space diversity is a well known technique for coping with such phenomena. Generally, the term "space diversity" refers to the technique wherein the system uses two or more receiver antennas and selects the better antenna. The two antennas head in the same direction but are physically spaced from each other so as to have little correlation with respect to interferential fading or multi-path reflections, and do not undergo deterioration in quality at the same time.

Space diversity may be applied to both the uplink and downlink transmissions using the two antennas spaced apart in a way that minimizes the correlation between the signals at the antennas. Hence, a base station system is normally comprised of three units: the base station hardware circuitry box, and the two antennas. S/N evaluation for each antenna is accomplished either by switching the antennas to a single receiver (a time-consuming in-line process), or by applying a receiver to each antenna for simultaneous reception (hardware consuming). The signal from the better receiving antenna is further processed and is used for controlling the downlink transmission.

WLL systems operating in high density populated urban areas have to deal with high traffic capacity situations, which leads to solutions of multiple, co-located base stations. Because of the large number of units, and the required spacing between the antennas, multiple co-located base station systems, each utilizing space diversity, demand a substantial amount of installation space, i.e., tower height and/or volume, popularly known as "Christmas Tree" sites.

Environmental regulations, customer requirements for a less conspicuous distribution site and for a more aesthetic appearance, simplified installation processes, and significant reduction of the currently-high installation costs and resources, all demand a more efficient system configuration than the existing ones.

OBJECTS AND BRIEF SUMMARY OF THE INVENTION

An object of the present invention is to provide a wireless duplex communication system, and also a method of operating a communication system, having advantages in the above respects.

Another object of the present invention is to provide an improved diversity transmission and reception architecture and method particularly useful for WLL TDD co-located multiple based stations, which architecture and method reduce significantly the number of antennas in each site and minimize the installation process and resource requirements.

According to one aspect of the present invention, there is provided a wireless duplex communication system, particularly for high density service areas serviced by a plurality of radio port units each including receiver-transmitter circuitry and an antenna; characterized in that each radio port unit further includes: a first port for connecting the receiver-transmitter circuitry of the radio port unit to the antenna of another radio port unit in the same service area; and a second port for connecting the antenna of the radio port unit to the receiver-transmitter circuitry of the other radio port unit; whereby each of the two radio port units shares the antenna of the other radio port unit to provide space diversity.

According to further features in the preferred embodiments of the invention described below, the receiver-transmitter circuitry of each radio port unit includes: a first receiver; a second receiver; a transmitter; a multi-port coupler for splitting the signal energy received by the antenna of the radio port unit and for directing a portion thereof as a first signal to the first receiver of the respective radio port unit, and another portion thereof as a second signal to the second receiver of the another radio port unit, such that the first receiver of each radio port unit receive signals from the antenna of the respective radio port unit, and the second receiver of each radio port unit receives signals from the antenna of the another radio port unit; and a selector for selecting the antenna providing the better received signal for connection to the transmitter of the respective radio port unit for transmission.

According to further features in the described preferred embodiments, each radio port unit includes: compensation circuitry in the receiver path to the multi-port coupler to compensate for losses in the multi-port coupler; compensation circuitry in the transmitter path to compensate for losses in the multi-port coupler; and isolation circuitry between the transmitter of the respective radio port unit, and the transmitter in the another radio port unit to be connected thereto, to reduce intermodulation products in the transmitted signal.

According to still further features in the described preferred embodiments, the radio port units are enclosed within boxes, each box including within it at least one radio port unit, its antenna, and its receiver-transmitter circuitry, each box further including first and second ports exposed externally of the box for connection to corresponding ports in a radio port unit of another box.

As will be described more particularly below, the invention may be implemented in a communication system wherein some of the boxes in the services area are: of the single radio port configuration wherein the box includes a single antenna, a single radio port unit, and a two-port coupler for coupling its antenna to another box; and/or of a dual radio port configuration wherein each box includes a single antenna, a single radio port unit, and a two-port coupler for coupling the respective internal antenna to another box; and/or of a dual radio port coupler configuration wherein each box includes a single antenna, two radio port units, and a four-port coupler for coupling the respective internal antenna to each of the two radio port units of its box as well as to each of the two radio port units of another box.

An advantage of this invention is that the Radio Port Coupler (RPC) maintains the flexibility to perform as a conventional base station system in cases where special antennas are required (i.e., omnidirectional, hi-gain, 120° sector. etc.), for applications of single base station sites, or different sector angle configurations. Reconfiguration of the RPC is simple and can be performed in the field as it merely involves unplugging the internal antenna and relocating an internal coaxial cable. Also, built into the RPC is the flexibility to perform as a conventional base station system using the internal antenna and a single external antenna for space diversity.

According to another aspect of the present invention, there is provided a method of operating a wireless duplex communication system in a high density service area, comprising: providing the service area with a plurality of co-located radio port units located spatially apart from each other; providing at least some of the radio port units with a single antenna; and externally connecting each of the radio port units having a single antenna to the antenna of another radio port unit heading in the same direction to enable each radio port unit provided with a single antenna to share the antenna of another radio port unit in order to produce space diversity for improving single reception under fading and multi-path channel conditions.

As will be described more particularly below, the present invention improves the facilities of a co-located cluster of fixed base stations which communicate with fixed subscriber units, and provides a space diversity system which reduces error probability caused by fading and multi-path channel conditions. Installations may thus be erected with a large number of co-located base stations in a substantially reduced installation space, while still complying with environmental regulatory requirements and also producing a more pleasing aesthetic appearance.

Further features and advantage of the invention will be apparent from the description below.

BRIEF DESCRIPTION OF THE DRAWINGS

The above features and advantages of the present invention will become apparent from the following detailed description when taken in conjunction with the accompanying drawings in which:

FIG. 1 illustrates the configuration of a typical prior art base station system;

FIG. 2 illustrates a single RPC (Radio Port Coupler) configuration in accordance with the present invention comprising a single radio port unit;

DESCRIPTION OF PREFERRED EMBODIMENTS

FIG. 1 illustrates a typical prior art base station system including three units: the radio port unit 12, and two antennas 13, 14 for space diversity located spatially apart from each other in a way that produces minimum correlation with respect to interfering signals. Each antenna 13, 14 is connected to the radio port unit 12 via a relatively short coaxial cable 15, 16 respectively. In case of multiple co-located base station sites, the same system is duplicated and mounted appropriately apart from each other, side by side, and/or one on top of the other.

Figure 3:
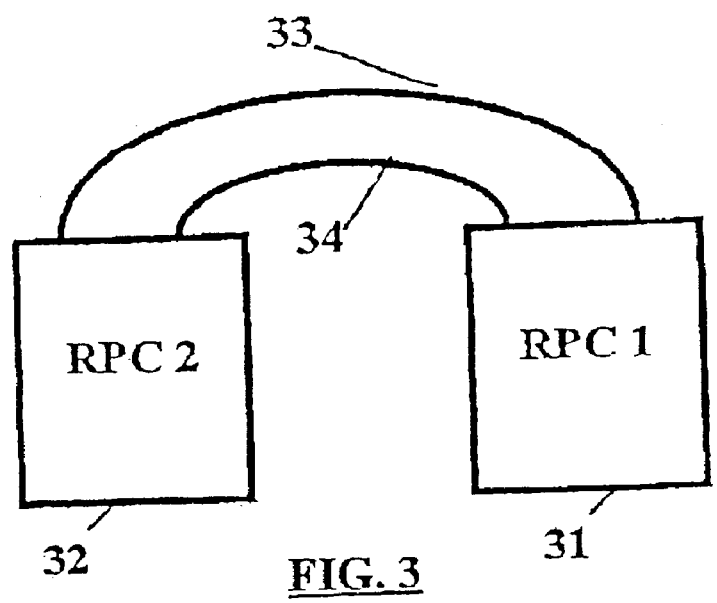
FIG. 3 illustrates a dual RPC configuration each comprising a single radio port unit.
Figure 4:
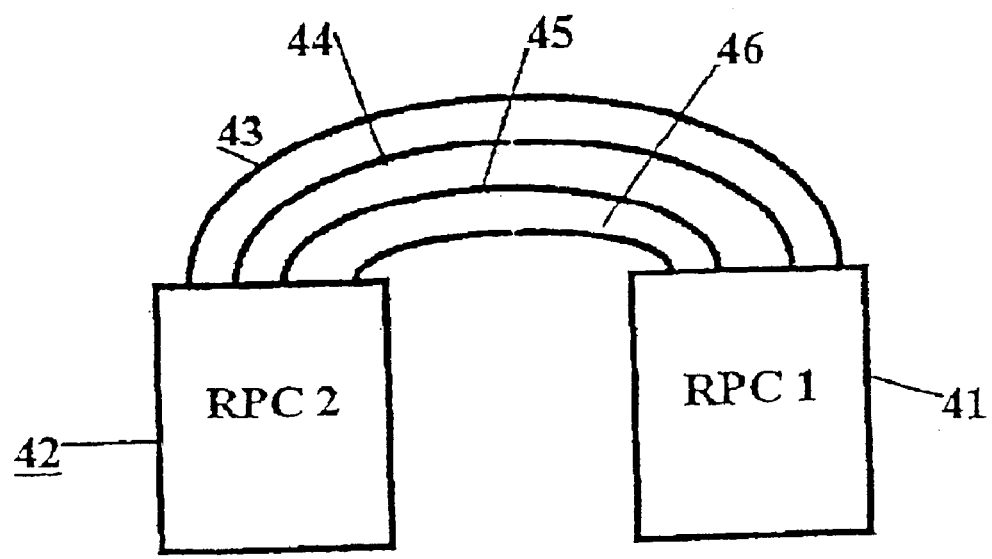
FIG. 4 illustrates a dual RPC configuration each comprising two radio port units.

FIGS. 2, 3 and 4 illustrate the present invention implemented in RPC (Radio Port Coupler) systems of various configurations including: a single radio port unit (FIG. 2), two radio port units (FIG. 3), and four radio port units (FIG. 4), respectively.

The system in FIG. 2 performs the same as the conventional base station of FIG. 1, but with only two boxes 21, 22 connected to each other by a single cable 23, rather than with the three boxes in FIG. 1. Box 21 of FIG. 2 is a Radio Port Coupler (RPC) constructed in accordance with the present invention. It contains a single internal antenna and is connectable to an external antenna 22 by a cable 23 to provide space diversity. One construction that may be used for RPC unit 21 of FIG. 2 is described below with respect to FIG. 5.

Figure 6:
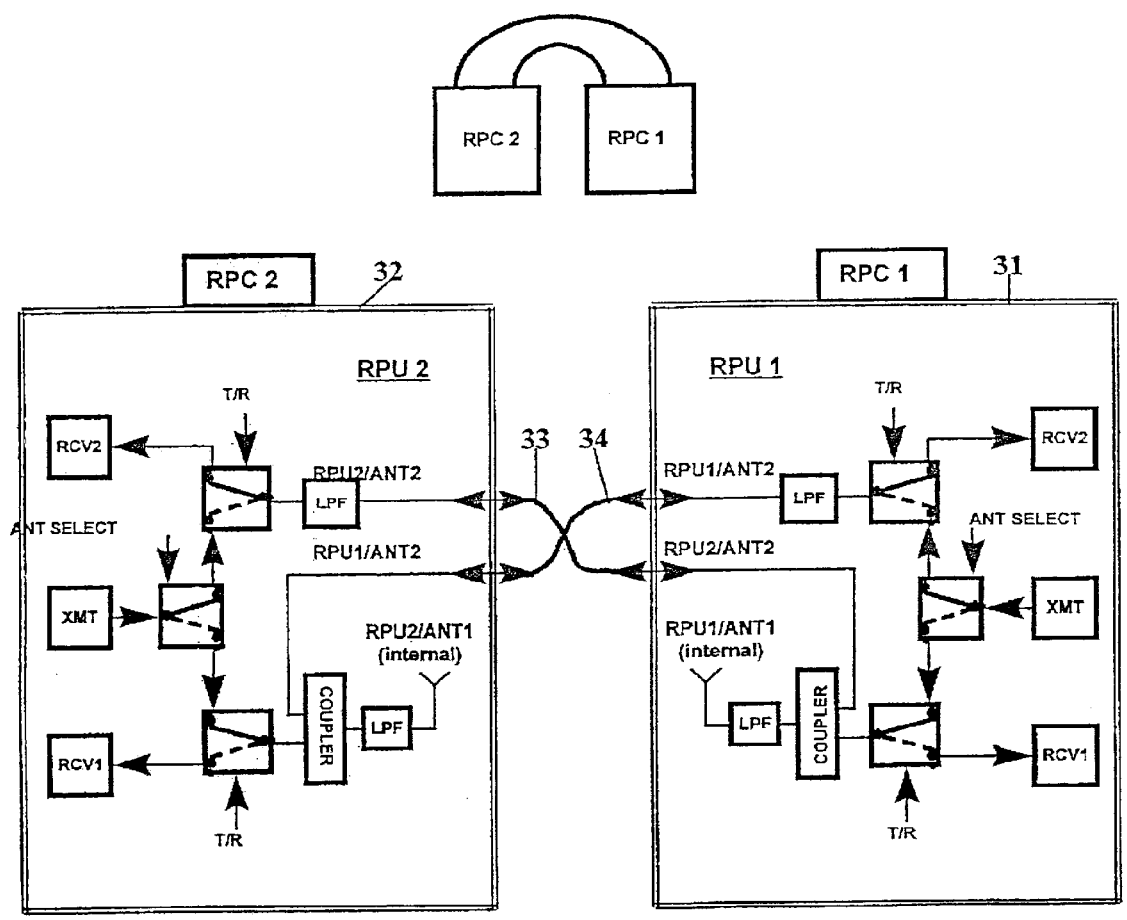
FIG. 6 shows the interconnection configuration of a dual RPC, each comprising a single radio port unit as shown in FIG. 3.

FIG. 3. illustrates a dual RPC configuration containing two boxes 31, 32, each including a single radio port unit (RPU) having a single internal antenna. The two RPC boxes 31. 32, are interconnected by two cables 33, 34. A specific construction that may be included in the dual RPC configuration of FIG. 3 is shown in FIG. 6, described below. Such a configuration, containing but two boxes, is equivalent to two sets of the conventional base station of FIG. 1, namely to six boxes.

Figure 7:
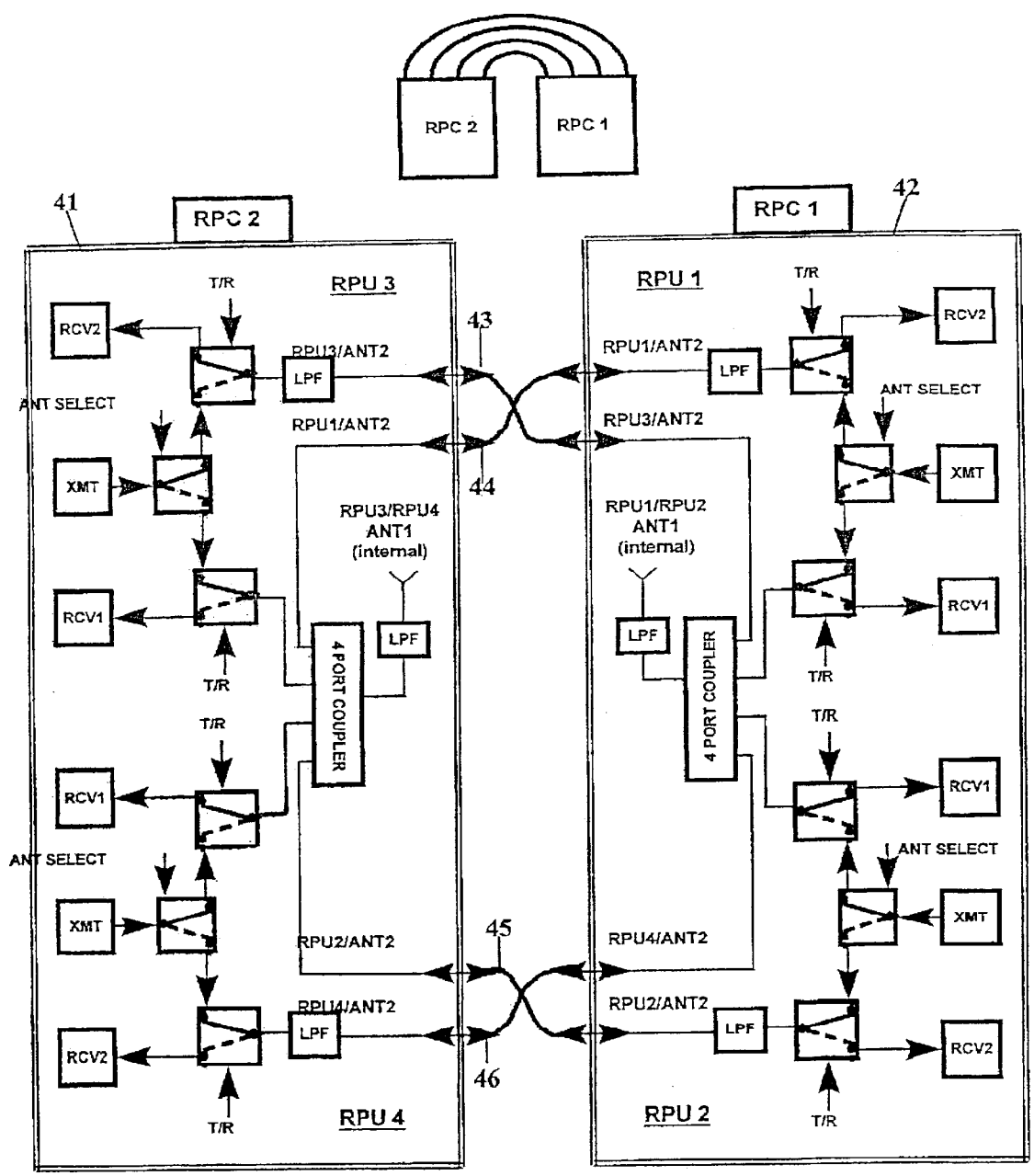
FIG. 7 shows the interconnection configuration of a dual RPC, each comprising two radio port units as shown in FIG. 4.

FIG. 4 illustrates a dual RPC configuration also containing two boxes 41, 42. Here, however, each box includes two RPU's; and the two boxes are interconnected by four cables 43, 44, 45 and 46. Such a dual RPC configuration, sometimes called a quad RPU system, is equivalent to four sets of the conventional station of FIG. 1, containing 12 boxes, rather than two boxes. FIG. 7, described below, illustrates a specific construction that may be used for the dual RPC configuration of FIG. 4.

It will thus be seen that the RPC configurations illustrated in FIGS. 2–4 drastically reduce the number of boxes required in a service area. For example, in a densely populated urban area, having a traffic density of 0.1 Erlang per subscriber in a 60° sectored system, and capable of handling eight simultaneous calls per radio port, the number of conventional base stations (FIG. 1) needed to serve 2000 subscribers with a GOS (grade of service) of 99% is 36. As each conventional base station (FIG. 1) comprises three boxes, a total of 108 boxes would be needed, averaging 18 boxes per sector (6 base station sets). By using the present invention architecture for this example, only four boxes per sector would be required instead of 18, these being two RPC boxes configured as in FIG. 3, and two RPC boxes configured as in FIG. 4. The first dual RPC configuration would comprise two radio ports, and the second one four radio ports. The total number of boxes for the whole site would be 24 instead of 108; thus in this case, the number of boxes would be reduced by a factor of 4.5, by using dual RPC configurations of the type illustrated in FIG. 4 only (in case the original number of base stations per sector is a multiple of 4), the maximal reduction factor would be 6. The RPC boxes of the present invention may maintain the same features and parameters as the standard radio port boxes. The RPC box could have the same front area, which is determined by the antenna; however the depth would be slightly larger to include the radio port circuitry.

Figure 5:
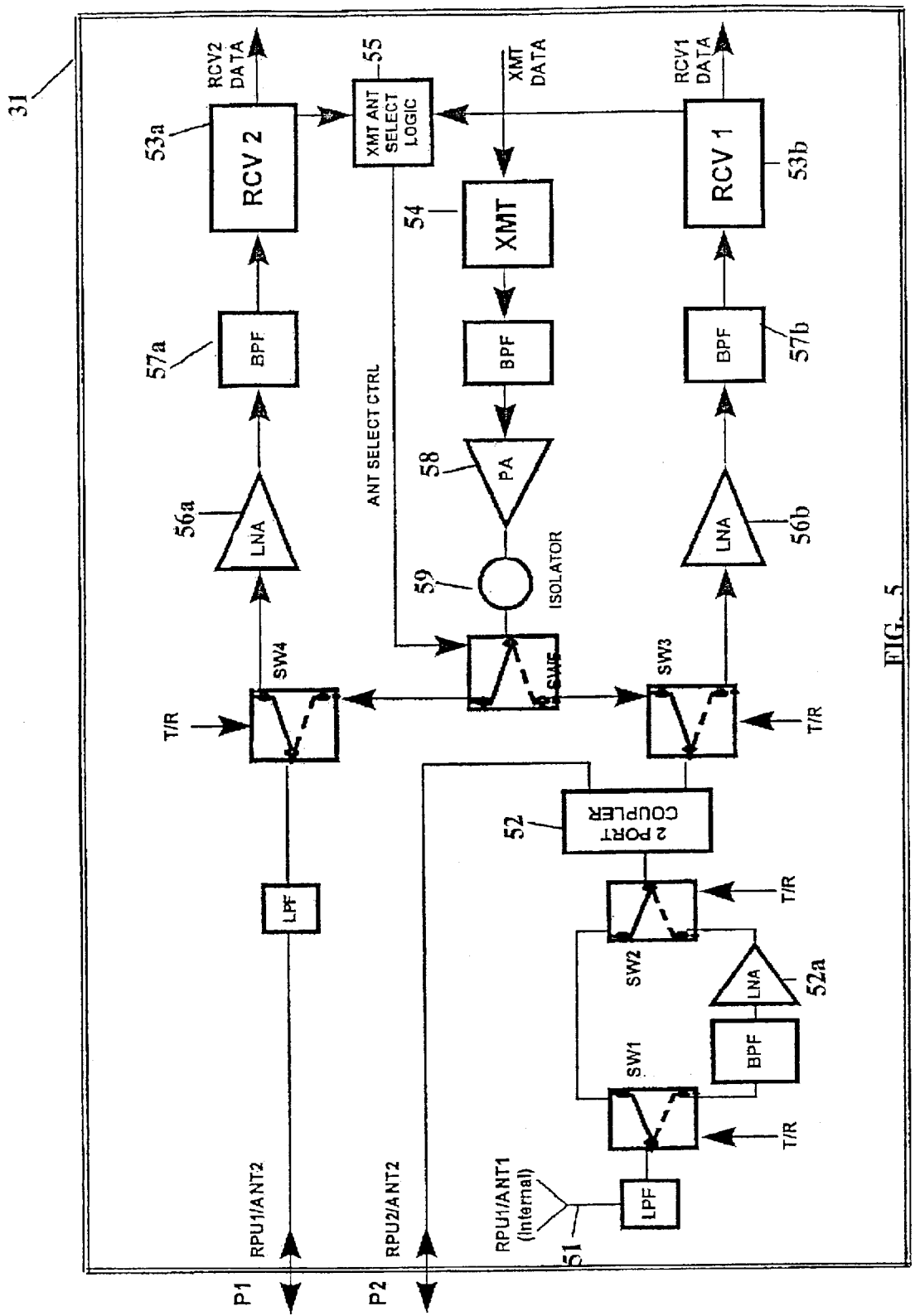
FIG. 5 is a detailed block diagram of an RPC with a single radio port unit such as shown in FIG. 2.

FIG. 5 is a detailed block diagram of a single RPC box, e.g., corresponding to box 31 in FIG. 3, which would be the same as box 32 in FIG. 3. Such a single RPU (Radio Port Unit) has a single internal antenna 51, and a two-port coupler 52. It further includes an RF connector port P1 which couples its receiver-transmitter circuitry, via a coaxial cable (e.g., 33, FIG. 3), to the internal antenna of the second RPC box, (e.g., box 32 in FIG. 3) which antenna is used as the second antenna to perform the space diversity. In the same way, the internal antenna 51 of RPC box 31 is coupled to the receiver-transmitter circuitry of RPC box 32 via connector port P2 to perform space diversity for the other box.

As shown in FIG. 5, each RPC box includes two receivers 53a, 53b, and a single transmitter 54. As will be described more fully below, the coupler 52 splits the signal energy received by the antenna of the respective box, and directs a portion thereof as a first signal to one of the receivers 53b of the respective box, and another portion as a second signal to the second receiver 53a of the other box to which the one box is connected via port P2. Thus, the first and second receivers of each box receive signals both from the antenna of its respective box and from the antenna of the other box connected to it, respectively.

Each box further includes a logic selector circuit 55 which compares the outputs of the two receivers 53a, 53b, and from this, determines the antenna providing the better received signal (using standard methods for analyzing received signal quality), and connects that antenna to the transmitter 54 for transmission.

Each RPC box further includes two switches, SW1, SW2, for directing the signal received by the internal antenna 51 to the two port coupler 52; via a bandpass filter and low noise amplifier 52a, and during transmission bypassing said amplifier and two further switches SW3, SW4, which serve as transmitter receiver switches enabling, during transmission periods, the appropriate antenna to be connected to the transmitter circuitry, and during reception to connect both antennas to the receivers circuitry. Each RPC box further includes another switch SW5, which serves as a transmitter selector switch controlled by the selector logic circuit 55 for selecting the appropriate antenna to be used for transmission during the transmission periods.

The illustrated system has full transmission-receiver synchronization. This means that all base stations (RPC boxes) and subscribers are synchronized so that when all RPCs transmit all subscribers receive, and when all subscribers are transmitting all RPCs are receiving.

For example, assuming the TDD system accommodates eight simultaneous subscribers, there would be eight time slots for down-link transmission from the base station to each subscriber, and eight time slots for up-link transmission from each subscriber to the base station. With each data burst for each subscriber, the signal is received during the receive period from its internal antenna 51, and from the antenna of the other RPC box via port P2, as controlled by the switches SW1, SW2. The multi-port coupler 52 of the respective RPC box splits the received signal energy from its internal antenna and directs a portion thereof as a first signal to its receiver 53b via switch SW3 in the respective box, and another portion as a second signal to receiver 53a of the other RPC box connected via port P2 and its switch SW4. Thus, each RPC box receives signals from its respective antenna and from the antenna of the other RPC connected to it. These signals are processed and compared by the selective logic circuit 55 which selects the antenna providing the better received signal, and then actuates the switch SW5 for connecting that antenna to the transmitter 54 for transmission during the transmission period.

The system illustrated in FIG. 5 includes compensating circuitry for compensating for various losses. This compensating circuitry includes a low-noise amplifier 52a in the receiver path between the internal antenna 51 and the two port coupler 52. Low-noise amplifiers 56a, 56b, and band path filters 57a, 57b are included in the receiver paths of the receivers 53a, 53b respectively.

In the transmitter path, the compensating circuitry includes a power amplifier 58, for compensating for the losses in the coupler, typically 3.5 db for a two port coupler, and 7 db for a four port coupler. The output of the transmitter 54 includes an isolator 59 which increases the isolation between the transmitters to improve the intermodulation products in the transmitted spectrum.

FIG. 6 is a simplified block diagram illustrating the two RPC boxes 31, 32 of FIG. 3, each box according to the construction illustrated in FIG. 5, connected together by the two cables 33, 34 of FIG. 3.

FIG. 7 is a simplified block diagram illustrating the dual RPC configuration corresponding to the diagram of FIG. 4, including two RPC boxes 41, 42, connected together by four cables 43, 44, 45, and 46. In this configuration, each antenna is shared by both RPU1 and RPU2 of box 42, as well as by RPU3 and RPU4 of box 41.

While the invention has been described with the respect to several preferred embodiments, it will be appreciated that these are set forth merely for purposes of example, and many other variations, modifications and applications of the invention may be made.

What is claimed is:

1. A wireless duplex communication system, particularly for high density service areas serviced by a plurality of radio port units each including receiver-transmitter circuitry and an antenna; characterized in that each radio port unit further includes:

a first port for connecting the receiver-transmitter circuitry of one radio port unit to the antenna of another radio port unit in the same service area;

and a second port for connecting the antenna of said one radio port unit to the receiver-transmitter circuitry of said another radio port unit;

whereby each of the two radio port units shares the antenna of the other radio port unit to provide space diversity.

2. The system according to claim 1, wherein said receiver-transmitter circuitry of each radio port unit includes:

a first receiver;

a second receiver;

a transmitter;

a multi-port coupler for splitting the signal energy received by the radio port unit via its antenna and for directing a portion thereof as a first signal to the first receiver of the respective radio port unit, and another portion thereof as a second signal to the second receiver of said another radio port unit, such that the first and second receivers of each radio port unit receives signals from the antenna of the respective radio port unit, and the second receiver of each radio port unit receives signals from the antenna of said another radio port unit;

and a selector for selecting the antenna providing the better received signal for connection to the transmitter of the respective radio port unit for transmission.

3. The system according to claim 2, wherein each radio port unit includes compensation circuitry in the receiver path to the multi-port coupler to compensate for losses in the receiver path.

4. The system according to claim 3, wherein said compensation circuitry in the receiver path includes a low noise amplifier.

5. The system according to claim 2, wherein each radio port unit includes compensation circuitry in the transmitter path to compensate for losses in the multi-port coupler.

6. The system according to claim 5, wherein said compensation circuitry in the transmitter path includes a power amplifier to increase the power output of the transmitter.

7. The system according to claim 2, wherein each radio port unit includes isolation circuitry between the transmitter of the respective radio port unit, and the transmitter in said another radio port unit to be connected thereto, to reduce intermodulation products in the transmitted signal.

8. The system according to claim 2, wherein each radio port unit further includes:

transmitter enabling switches which enable either the antenna of the respective radio port units or the antenna of said another radio port unit during transmission periods;

and a transmitter selector switch controlled by said selector for selecting the antenna to be used for transmission during the transmission period.

9. The system according to claim 8, wherein said radio port unit further includes receiver enabling switches which enable both the antenna of the respective radio port unit and the antenna of said another radio port unit during receiving periods.

10. The method according to claim 1, wherein said radio port units are enclosed within boxes, each box including within it at least one radio port unit, its antenna, and its receiver-transmitter circuitry, each box further including said first and second ports exposed externally of the box for connection to corresponding ports in a radio port unit of another box.

11. The system according to claim 10, wherein at least some of said boxes in the service area are of a single radio port configuration, each box including a single antenna, a single radio port unit, and a two-port coupler for coupling its antenna to the radio port unit of another box.

12. The system according to claim 10, wherein at least some of said boxes in the service area are of a dual radio port configuration, each box including a single antenna, two radio port units, and a four-port coupler for coupling the respective antenna to the radio port units of its box and of another box.

13. The system according to claim 1, wherein said communication system is a Time Division Duplex (TDD) Digital System.

14. A method of operating a wireless duplex communication system in a high density service area, comprising:

providing the service area with a plurality of radio port units located spatially apart from each other but heading in the same direction;

providing at least some of said radio port units with a single antenna;

and externally connecting each of said radio port units having a single antenna to the antenna of another radio port unit within said service area to enable each radio port unit provided with a single antenna to share the antenna of another radio port unit in order to produce space diversity for improving single reception under fading and multi-path channel conditions.

15. The method according to claim 14, wherein said signal reception is improved by:

splitting the signal energy received by each radio port unit and directing a portion to a first receiver within the respective radio port unit and to a second receiver within said another radio port unit, such that the first and second receivers of each radio port unit receive signals from the antenna of its respective radio port unit and also from the antenna of said another radio port unit to which it is connected;

and selecting the antenna providing the better received signal for connection to the transmitter of the respective radio port unit for transmission.

16. The method according to claim 15, wherein said signal energy received by each radio port unit is split between said first and second receivers by means of a multi-port coupler in the respective radio port unit;

and wherein losses in the receiver path to the multi-port couplers are compensated for by compensation circuitry in said receiver path.

17. The method according to claim 16, wherein losses in the multi-port coupler are compensated for by compensation circuitry in the transmitter path.

18. The method to claim 17, wherein intermodulation products in the transmitted signal are reduced by providing isolating circuitry in the transmitter circuitry of the respective radio port unit.

19. The method according to claim 15, wherein said radio port units are enclosed within boxes, each box including within it at least one radio port unit, its antenna, and its receiver-transmitter circuitry, each box further including first and second ports exposed externally of the box for connection to corresponding ports in a radio port unit of another box.

20. The method according to claim 15, wherein said communication system is a Time Division Duplex (TDD) Digital System.

* * * * *